Sept. 14, 1965    J. R. CRAWFORD    3,206,287
MATERIAL TREATMENT APPARATUS

Original Filed May 10, 1960                4 Sheets-Sheet 1

INVENTOR.
JAMES R. CRAWFORD

Sept. 14, 1965  J. R. CRAWFORD  3,206,287
MATERIAL TREATMENT APPARATUS
Original Filed May 10, 1960  4 Sheets-Sheet 2

INVENTOR.
JAMES R. CRAWFORD

INVENTOR.
JAMES R. CRAWFORD

Sept. 14, 1965        J. R. CRAWFORD                3,206,287
                  MATERIAL TREATMENT APPARATUS
Original Filed May 10, 1960                    4 Sheets-Sheet 4

INVENTOR.
JAMES R. CRAWFORD

United States Patent Office 3,206,287
Patented Sept. 14, 1965

3,206,287
MATERIAL TREATMENT APPARATUS
James R. Crawford, New Canaan, Conn., assignor to Crawford & Russell, Inc., Stamford, Conn.
Continuation of abandoned application Ser. No. 28,166, May 10, 1960. This application May 17, 1963, Ser. No. 281,303
8 Claims. (Cl. 23—285)

This application is a continuation of my earlier filed application S.N. 28,166, filed May 10, 1960, now abandoned.

This invention relates broadly to material-treatment apparatus and method. More particularly it is concerned with new and improved apparatus and method which are suitable for use in any operation involving the heating, cooling or mixing of viscous materials. Examples of such operations are soap manufacture, grease making, the bulk or the solution polymerization of polymerizable monomeric materials or mixtures of such materials (e.g., styrene, isoprene, butadiene, vinyl chloride, etc.), the bodying of natural oils, e.g., tung oil, linseed oil, etc.; and the like.

In operations of the kind described above the highly viscous nature of the mass makes fluid mixing and convective heat transfer extremely difficult. This is especially true in many chemical reactions whereby heat is evolved and the viscosity of the fluid mass increases. Typical reactions of this kind are many polymerization reactions, including the liquid-phase polymerization and copolymerization of polymerizable olefins, e.g., ethylene, propylene, 1-butene, 1-pentene, butadiene, isoprene, etc. In making homopolymers and copolymers of high molecular weight from these and other polymerizable monomers by, for example, solution-polymerization technique, the molecular weight and physical characteristics of the polymerization product are materially influenced by the particular operating conditions employed, including such factors as, for example, time and temperature of reaction, concentration of monomeric material in the chosen solvent, uniformity of the reaction mass, and also, in many instances, the pressure at which the reaction is carried out. When temperature and other operating conditions are not maintained substantially uniform throughout the polymerization period, the physical characteristics of the resulting polymer are non-uniform with obvious disadvantages from a sales and utility standpoint.

In polymerization reactions of the kind broadly described in the preceding paragraph, the highly exothermic nature of the reaction necessitates the removal of a large amount of heat. It also requires the highest efficiency of agitation so that temperature gradients throughout the reaction chamber or vessel will be at a minimum. Maximum efficiency of agitation also is important because of the need for uniform concentrations of reactant(s) throughout the fluid reaction mass; and, additionally, because of the necessity for immediate dispersal of the material being charged to the reactor as soon as it enters the reactor. All of these features, including the highly viscous character of the fluid mass comprising solvent and polymer dispersed and/or dissolved therein, add greatly to the problems of effectively controlling such polymerization reactions and, particularly so, since the aforementioned features are inherent in the reaction itself.

Attempts to solve the problem stated above have taken many different forms but, to the best of my knowledge and belief, none has been entirely satisfactory. Attempts to solve the problem by reducing the concentration of the formed polymer in the solvent, thereby lowering the viscosity of the fluid reaction mass, have not been satisfactory because this results in a decrease in the overall efficiency of the reactor. Prior attempts to solve the problem by improved designs of reactors likewise have not been entirely satisfactory, since the problem is accentuated by the fact that insufficient agitation throughout the reactor causes, or tends to cause, gummy or solid deposits of polymer to build up on the cooling surfaces, thereby reducing the efficiency of the means employed to regulate the temperature in the reaction vessel. The problem is accentuated by the further fact that the heat-transfer coefficient of the fluid film on the cooling surfaces is decreased by the viscous character of the fluid reaction mass.

It is a primary object of the present invention to provide new and improved apparatus for the treatment of materials, and especially for carrying out polymerization and other chemical reactions.

Another object of the invention is to provide apparatus for effecting solution polymerization of polymerizable monomeric materials that normally yield highly viscous fluid masses, and whereby there is attained minimum variation, throughout the reaction mass, of both the temperature of the fluid mass and concentration of reactant therein.

Still another object of the invention is to provide a new and improved agitating and scraping member.

A further object of the invention is to provide improved apparatus for the treatment of materials, and especially those which require the removal of heat therefrom during processing and which are normally in the form of a highly fluid, viscous mass while being processed; as well as those which require the addition of heat thereto during processing.

Other objects of the invention will be apparent to those skilled in the art from the following description and accompanying drawings.

The novel features which characterize my invention are set forth in the appended claims. The invention itself, however, will be understood most readily from the following more detailed description when considered in connection with the accompanying drawings wherein FIGURE 1 is a vertical sectional view of a material-treatment apparatus that shows one embodiment of my invention;

Figure 1:
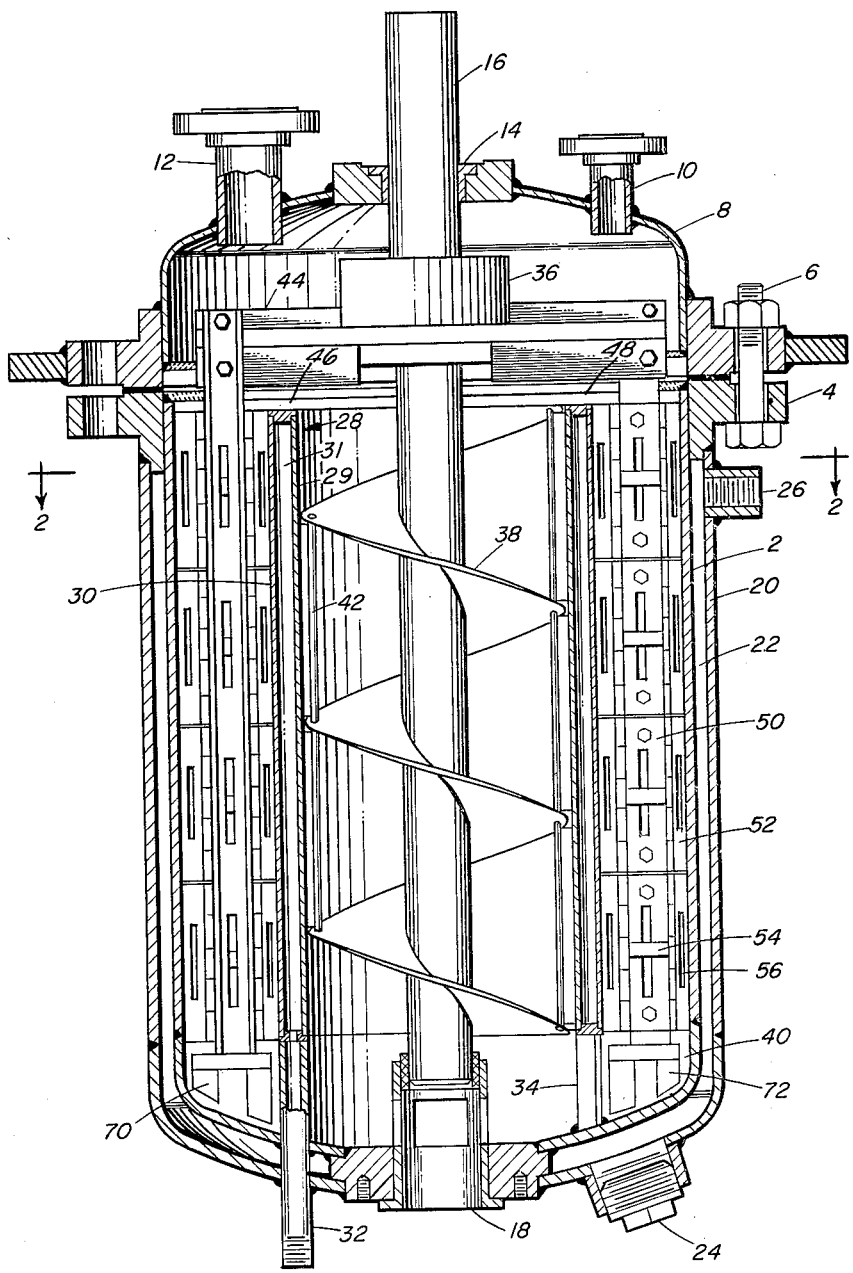

The objects of the invention are attained by a novel and unobvious combination and arrangement of elements constituting the material-treatment apparatus of the invention and by the method of mixing and agitating the material to provide a compound eddy motion therein.

The material-treatment apparatus with which this invention is concerned is especially useful in carrying out polymerization and other chemical reactions, although its use is not limited thereto. It is of the general type of "reactor" (and hereafter for brevity is sometimes designated as such) which is sometimes referred to as a "high-viscosity reactor" or as a "scraped surface reactor." The reactor of this invention may be operated as a plug flow reactor or as a stirred reactor.

In its broadest aspects the material-treatment apparatus or reactor of this invention comprises a plurality of substantially coaxial cylindrical tubes including an inner tube and an outer tube within a main body portion or shell having side and end walls. A particularly useful reactor is one having at least one intermediate tube. A heat-exchange jacket surrounds each tube, which jacket when surrounding the outer tube may be the same jacket that surrounds the main body of the reactor itself. Suitable means are provided for supplying a heat-exchange fluid, which may be a cooling medium such as water or a heating medium such as steam, to and removing it from each of the aforementioned heat-exchange jackets. The end walls of the aforesaid shell or container are spaced apart from the aforesaid inner tube, intermediate tube(s) (if present) and outer tube, and comprise means for closing the ends of said tubes, including the outer or outermost tube, while permitting the circulation or recirculation of fluid through all of the tubes. Material-propelling means also are provided for propelling the material to be treated longitudinally through the innermost of the aforementioned cylindrical tubes and forcing it, more particularly under pressure, through the other tube(s). Means including agitating and scraping devices also are provided for agitating the material between the innermost and the outermost of the aforesaid tubes and for scraping the surfaces of said tubes and jackets between the innermost jacket and the outermost tube. Means such as electric motors or other sources of power are provided for rotatably driving the material-propelling means and the agitating and scraping means.

The material-propelling means to which reference was made in the preceding paragraph is preferably a screw-axis stirrer or a helical-ribbon stirrer since optimum results are obtained by the use of such devices (which generically may be designated as a helical screw), particularly when there is almost no clearance between the aforesaid stirrer and the wall of the open-ended tube in which it operates. Conventional stirrers such as paddles, turbines, anchors and special shapes such as rakes, louvres, etc., are not nearly so effective and are not the equivalent of a screw-axis stirrer or a helical-ribbon stirrer.

The present invention utilizes a material-propelling means, specifically a screw-axis stirrer or a helical-ribbon stirrer in a new relationship, namely in a reactor wherein it is, for all practical purposes, "buried down" in a reaction mass. Furthermore, in the reactors of the present invention scrapers (also agitation) are provided on both the inside and outside of a jacketed innermost tube and the inside of an outermost tube with, preferably, at least one intermediate tube. In other words, the reactors of this invention include scrapers which scrape substantially 100% of the wall length and stretch across the whole of the annular space of which the reactor is comprised. This is important from the standpoint of promoting lateral mixing in the annular space and, as a result, provides better mixing and better heat transfer than heretofore has been attained with the prior-art reactors.

It is to be noted that the reactors of this invention include a plurality of substantially coaxial cylindrical tubes within the reactor shell. By using a multiplicity of such tubes within the reactor one can materially increase the heat-transfer area in a given reactor and, therefore, make much easier the problem of "scale-up." Ordinarily, a reactor cannot be scaled up too far because the heat load goes up as the cube of the dimension but the heat-transfer area goes up as the square of the dimension. Thus, a large reactor of the prior art design may not have enough heat-transfer area.

It is also to be noted that the reactors of the instant invention utilize scraping means for scraping substantially all of the heat exchange surfaces of the aforementioned tubes and jackets positioned within the shell or main body of the reactor. This is a matter of considerable practical importance for two reasons:

(1) The heat-exchange surfaces are continually scraped, and therefore, fouling with high-viscosity material is avoided.

(2) The action of scraping and "peeling" material from the walls creates a lateral mixing which blends material from the walls with that in the middle and, consequently, promotes heat transfer. By scraping from both walls simultaneously, this action is increased.

In operating the reactors of the instant invention the fluid mass to be processed is moved circularly by the scraper blades and assembly, which occupy the whole of the annular vertical cross section of the reactor and, upon rotation, bodily shove the mass in front of it. The material-propelling means, e.g., a screw-axis stirrer, imparts a vertical velocity to the mass and causes it to move at right angles to the motion of the scraper blades. As a result of these motions the agitated mass is caused to move in a helical path past the heat-transfer surfaces. In addition, the forward-pointing scraper blades remove material from the walls and impart to it a velocity such that the material moves back into and blends with the moving mass. This action is very similar to the eddy mixing action of turbulent flow and is quite important in promoting higher heat-transfer rates.

The positioning of the scraper blades is important. They should point forward and not backward or straight to the wall. They are hinged so that they are free to move. The action of the viscous mass against the blades forces them against the surface of the wall adjacent to the individual blade. Hence it is not necessary to load them with springs or weights. Likewise, it is unnecessary to machine either the walls or the blades very accurately. Hence the cost of the reactor is materially reduced.

A preferred agitating and scraping member of the present invention comprises a rotatable support upon which is pivotally mounted a scraping-blade element that is adapted to swing outwardly from this support. In the preferred embodiment this scraping-blade element has one or more apertures therein for the passage of material therethrough. Suitable means, e.g., a spacing block mounted on the aforesaid support, are provided for preventing the scraping element from pivoting inwardly to within an angle of about 10° to the perpendicular to the said support. Advantageously there is employed a pair of scraping-blade elements pivotally mounted in transversely spaced relation on the aforesaid support. Advantageously, also, both the support and the scraping-blade elements have apertures therein for the passage of material therethrough.

From the foregoing general description of the reactor of the present invention it is believed to be clear that its unobvious combination of elements provides a relatively simple and economical solution to the problem of effecting adequate and efficient mixing of fluids of a highly viscous nature accompanied by convective heat transfer. The combination of forced motion by the pumping action of the material-propelling means, specifically a helical screw in an open-ended cylindrical tube, the scraping action of the blades, and the use of one or more of the aforementioned substantially coaxial cylindrical tubes provides a reactor which is an efficient mixer and a good heat exchanger.

With further reference to one of the stated objects of the invention, namely, to provide an improved method for the treatment of materials, it may be stated that, in its broadest aspects, this embodiment of the invention comprises causing an agitated and moving mass of material to move in a helical path past a heat-transfer surface, and removing material from the said heat-transfer surface and imparting to it a velocity such that the material moves into and blends with the said moving mass. Another method embodiment of the invention comprises propelling material longitudinally through a first zone of treatment, progressively forcing said material through other zones of treatment under pressure, agitating said material during its passage through said first zone of treatment and said other zones, and, when desirable or required, removing material deposited on the surfaces of said zones from said surfaces during the passage of said material through said zones. Thus, the present invention provides a method which comprises causing a moving mass of material to move in a helical path past a heat-transfer surface, removing material deposited on said surface during the passage of said material past said surface, and progressively forcing said material through other zones of treatment under pressure while concurrently therewith removing any material deposited on the surfaces of said other zones from said surfaces during the passage of said material through said other zones.

Referring now to the accompanying drawings and more particularly to FIGURE 1 thereof, the material-treatment apparatus or reactor there shown comprises a vertical, cylindrical shell or container 2, which is fixedly attached to a circular flange 4 by suitable means, e.g., by screw threads or welding. Attached to the flange 4 by bolts 6 is a removable head 8 containing one or more openings 10 and 12 through which the process streams may enter or leave. When the mixing is very rapid and the contents of the reactor are of substantially the same concentration throughout, the exit may be located at any point in the shell of the vessel. Since the mixing of the contents of the vessel is not instantaneous, it is usually not desirable to place the entrance or inlet and exit or outlet immediately adjacent to each other. However, when the inlet and outlet are placed on opposite sides of the reactor as shown in FIGURE 1 and under the normal conditions of operation wherein the reactor is operated entirely full and there is a relatively low ratio of input-feed rate to internal-recirculation rate, there is no appreciable "short-circuiting" of material coming through the inlet opening and passing directly to the outlet opening.

The material-propelling means, e.g., a helical screw, constituting an element of the apparatus of the present invention causes the material being treated to move up or down in the subsantially coaxial, cylindrical, inner-most tube at a rate which is sufficiently high that there is a rapid circulatory motion of the material. The rate is caused, by proper adjustment of the rotational speed of the screw and the rate of feed input, to be so high in relation to the feed rate that the material in the vessel is thoroughly mixed. Since the recirculation rate is relatively high in comparison with the feed rate (e.g., from 20 to 1 to 100 to 1), the feed material is rapidly blended with the resident material. Consequently the concentration of the mixture of the fresh feed material and of the older resident material in the reactor is substantially uniform.

Referring again to FIGURE 1 of the accompanying drawings, the head 8 also contains a central opening 14 through which a mechanical drive shaft 16 passes. The upper end of shaft 16 is connected to a suitable means of mechanical propulsion (not shown), e.g., an electric motor, a hydraulic turbine, etc., by any of a variety of methods well known to those skilled in the art.

The shell 2 also is provided with a bottom opening 18 through which the process materials may enter or leave. Surrounding the shell 2 and concentric with it is a jacket 20 which encloses an annular space 22 through which heating or cooling fluid, e.g., steam or water as may be required for the particular material being processed, may circulate through the openings 24 and 26.

The head 8 is preferably dish- or spherically-shaped so as to withstand pressure or vacuum, but, as desired or as conditions may require, it may be flat for greater ease and economy in fabrication.

Within the cylindrical shell or vessel 2 is a cylindrical tube 28 which is opened at the top and bottom. This cylindrical tube has an inner wall 29 and an outer wall 30, which walls define the annular space or jacket 31 through which heating or cooling fluid may be passed. The annular space 31 is connected to a source of heat-transfer fluid by the connecting tube(s) or pipe(s) 32 which extend(s) through the shell 2 and jacket 20.

The jacketed cylindrical tube 28 has an outside diameter which is less than the inside diameter of the shell 2 but preferably extends such a distance that the cross sectional area of the inside or hollow portion of the tube 28 is approximately equal to the cross sectional area of the annular space contained between the inner diameter of the shell 2 and the outer diameter of the cylindrical tube 28. It will be understood, of course, that the aforementioned ratio of the stated cross sectional areas is intended for purpose of illustration only, and not by way of limitation, and is not intended in any way to be a restriction on the cross sectional areas of the designated elements. In other words, the inner diameter of the tube 28 may be varied as desired or as conditions may require for the particular use of the reactor under optimum conditions of operating efficiency.

The radial width of the annular space 31 defined by the walls 29 and 30 which form the heat-exchange jacket of the cylindrical tube 28 may be varied as desired or as conditions may require, but ordinarily is approximately one inch or less depending, for instance, upon the size of the particular reactor and the particular use for which it is intended.

As has been mentioned hereinbefore, the cylindrical tube 28 is open at both its top and bottom ends so that the material being processed may pass freely in and out of the tube at either end. The tube 28 is mounted in its proper position and is supported by the tube(s) or pipe(s) 32 for conveying heat-exchange fluid into and out of the annular space 31 and by the support leg(s) 34. The tube(s) 32 ordinarily is (are) longitudinally partitioned so that the heat-exchange fluid, if a liquid, enters through one side of the annular space 31, and then overflows or is permitted to pass downwardly and out of the tube through the other side of the said space 31. When the heat-exchange fluid is a gas such as steam, it is immaterial whether or not the space 31 be partitioned.

Attached to the drive shaft 16 by a suitable mechanism such as a keyed sleeve 36 is a material-propelling means, specifically a helical screw 38, which occupies substantially all of the inner diameter of cylindrical tube 28 and rotates therein when the apparatus is in operation. The rotaion of the shaft and the helix causes the material being processed to move up or down in the tube in the well-known manner of helical screws. Furthermore, the material will move simultaneously in the annular space 40 in the opposite direction from that in the tube 28, thus giving a vertical, circulatory motion to the material in the reactor. Since both the tube 28 and the shell 2 of the reactor are jacketed for heat transfer, the movement of the material past the cooled or heated surface results in a transfer of heat from or to the moving material.

The helical screw is an effective device for the movement of highly viscous materials, as has been indicated hereinbefore; and by causing such a screw to rotate in a centrally located (i.e., substantially coaxial) tube, such as tube 28, one can mix highly viscous materials in a rapid and effective manner. The screw acts as a pump and causes recirculation to take place through the outer passageway(s) where the surfaces are being scraped.

Figure 2:
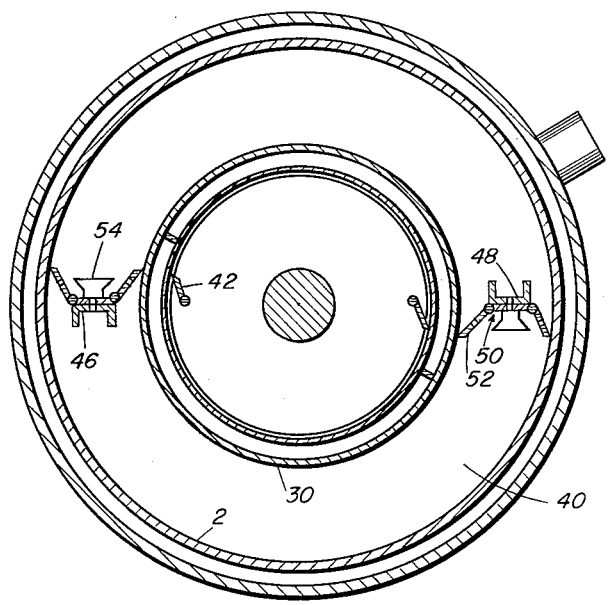
FIGURE 2 is a horizontal sectional view of the material-treatment apparatus of FIGURE 1 taken along the lines 2—2 thereof.

The helical screw 38 is equipped with scraper blades 42 pivotally or fixedly attached to the edges of the helix and bearing against the inner wall 29 of the tube 28. The scraper blades 42 remove the viscous material from the wall 29 and aid in mixing it back into the moving mass. The scraping of the wall 29 greatly increases the heat-transfer capability of the apparatus. The scraper blades 42 are preferably a plurality of longitudinally extending, circumferentially spaced scraping elements pivotally mounted on the propelling member, the screw 38, extending at an angular inclination outwardly and forwardly in the direction of material propulsion by screw 38, as shown in FIGURE 2, for scraping the inner surface of the tube 28.

Also attached to the drive shaft 16 is a horizontal cross arm 44 which extends across the top of the reactor above the cylindrical tube 28. This cross arm carries two vertical channel beams 46 and 48 which extend vertically downward at least as far as the tube 28, and preferably a few inches further into the annular space 40 between the outer wall 30 of the jacket surrounding the tube 28 and the inner portion of the wall defining the shell 2. These channel beams carry a multiplicity of hinged scraper members 50 (FIGURES 2 and 5), which are bolted to the beams and which are arranged so that the scraper blades 52 point forward in the direction of motion. The scraper members 50 are provided with spacer blocks 54 which prevent the movable blades 52 from forming an included dihedral angle of less than, for example, about 110°. This ensures that the blades will be forced against the walls by the movement of the scrapers through the mass of viscous material.

The hinged scraper members 50 occupy all of the vertical distance of the tube defined by the wall 30 and the inner portion of the wall of the shell 2. Consequently the material being processed is moved bodily in front of the scrapers and has imparted to it a helical motion caused by the vertical motion from the helical screw 38 and the horizontal motion from the scrapers.

Advantageously the scraper blades have suitable openings, which may take the form of, for instance, vertical slots 56 (FIGURE 5), milled or cut into their faces to permit passage of material from front to back so that unmixed or partially reacted material will not build up on the face of the individual scraper blade. The channel beams 46 and 48 and hinged scraper members 50 where attached to the said beams likewise may have, in their middle sections, slots 56 that extend through the channel beams in the same manner as the corresponding slots in the scraper blades themselves. The slots 56 are advantageous but are not essential and may be omitted as desired or as conditions may require.

It is, of course, not necessary that the number of sets of hinged scraper members be only two. Any desired number can be used. However, two are preferred. It is also not necessary that the scraper blades occupy all of the vertical distance in the annular space 40. Any arrangement can be employed including alternate spacing of the scraper members on opposite sides. However, the arrangement shown in FIGURE 1 is preferred.

Figure 5:
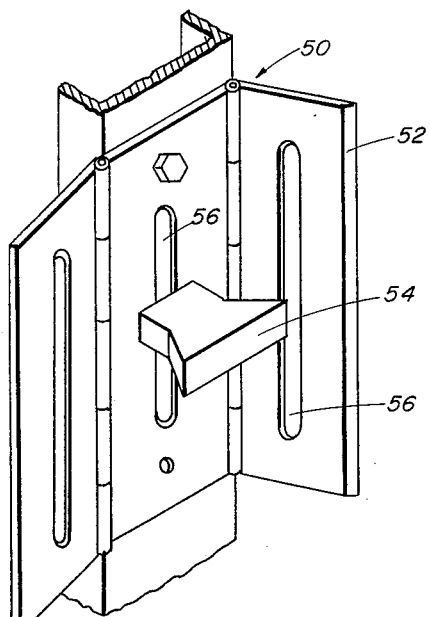
FIGURE 5 is a perspective view of a section of an agitating and scraping member representing a preferred embodiment of such a member and which is shown in FIGURES 1 and 3 in its relation to other elements of the material-treatment apparatus.

From the foregoing description and FIGURES 1, 2 and 5 of the drawings of this case it will be noted that the present invention provides means for agitating material between the tube 28 and the container 2, which means comprises a plurality of agitating-scraping elements mounted for rotation around said tube for scraping the outer surface of the jacket surrounding said tube and the inner surface of the container. In a preferred or advantageous embodiment the agitating-scraping elements have substantial apertures therein that provide for the passage of material therethrough on rotaion thereof whereby agitation of the material is augmented. The invention provides a plurality (e.g., 2, 3, 4 or any desired higher number) of longitudinally extending, circumferentially spaced scraping elements pivotally mounted on a material-propelling member for angular inclination outwardly and forwardly in the direction of material propulsion for scraping the inner surface of the cylindrical tube 28.

The invention additionally provides means for agitating material between the tube 28 and the inner surface of the container 2 comprising a plurality of longitudinally extending, circumferentially spaced supports mounted for rotation around the tube 28; a plurality of longitudinally extending, agitating-scraping elements pivotally mounted on both radial sides of the aforementioned supports for angular inclination outwardly therefrom and in the direction of rotation for scraping the outer surface of the jacket surrounding the tube 28 and the inner surface of the container 2; and means for rotatably driving the aforesaid material-propelling member and the aforesaid scraping elements. Means also are provided for preventing the agitating-scraping elements from pivoting inwardly to positions less than an angle of about 10° to the direction of rotation. The agitating-scraping elements may be longitudinally staggered on opposite sides of each support to which they are attached and longitudinally staggered on corresponding sides of adjacent supports thereby to provide for scraping all of the surfaces between the outer surface of the jacket surrounding the tube 28 and the inner surface of the container 2.

The apparatus shown by way of illustration in FIGURE 1 is particularly adapted for use where a material-treatment unit or reactor of relatively small size is desired. For units of larger size it is generally advantageous to provide apparatus comprising a plurality of substantially coaxial cylindrical tubes including an outer tube and an inner tube with at least one (for example, 2, 3, 4, 5 or any higher desired number) of intermediate tubes and wherein all surfaces in contact with the material being processed are scraped. In such larger reactors it is also usually desirable to use a completely welded vessel so as to avoid the cost of a large flange that would be heavy enough to withstand a high internal pressure.

Figure 3:
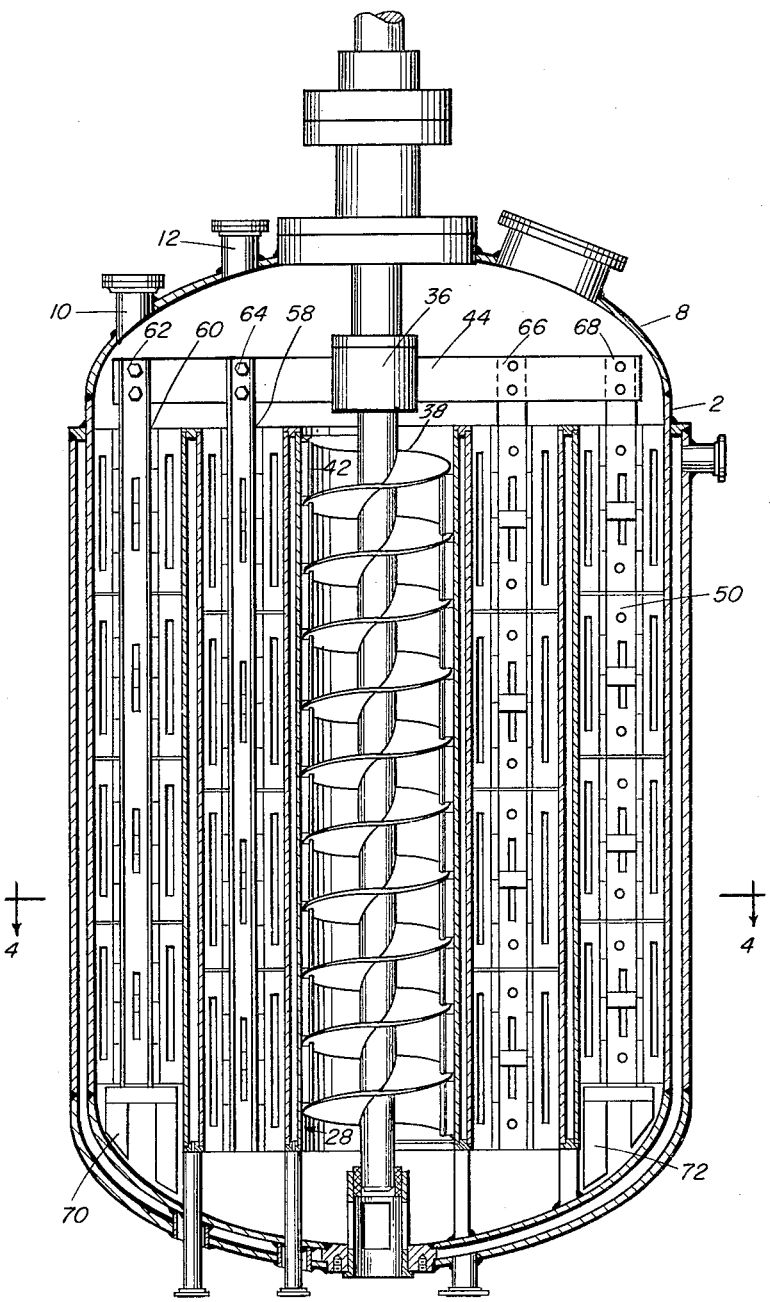
FIGURE 3 is a vertical sectional view of a material-treatment apparatus that shows another embodiment of my invention.
Figure 4:
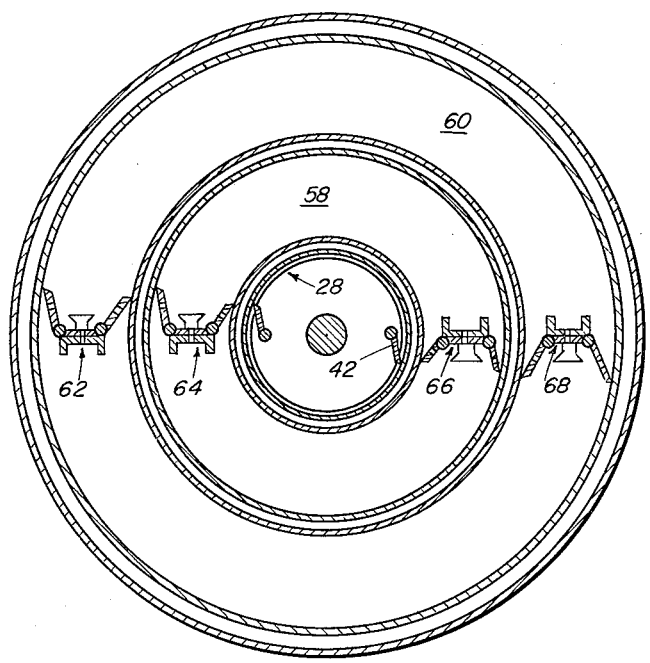
FIGURE 4 is a horizontal sectional view of the material-treatment apparatus of FIGURE 3 taken along the lines 4—4 thereof.

FIGURE 3 shows a material-treatment apparatus or reactor of the same general type as that illustrated in FIGURE 1. (In this figure corresponding parts have for the most part been given the same numbers as those employed in FIGURES 1 and 2.) In FIGURE 3 it will be noted that the head 8 is welded to the shell or container 2. The helical screw 38 rotates in the cylindrical tube 28 and is equipped with scrapper blades 42 in the same manner as the apparatus shown in FIGURE 1. The material being processed flows down or up, as desired, in the tube 28 and then in the opposite direction in the annular spaces 58 and 60 (FIGURES 3 and 4). The vertical arms 62, 64, 66, and 68 carry hinged scraper members 50, and these are arranged and operate in the same way as those shown in FIGURES 1, 2 and 5. The bottom of the arms 62 and 68 are shown equipped with flat metal blades 70 and 72, which are set at an angle and are used to facilitate the movement of the contents. Such metal blades are also shown in FIGURE 1 but may be omitted if desired.

The openings in the head 8 of the apparatus illustrated in FIGURE 3 are large enough and located so that the cross arm 44 and the vertical channels 62, 64, 66, and 68 may be unbolted and withdrawn from the container. In a large reactor the distance between the walls defining the tubes or annular spaces within the reactor may be large enough to permit a workman to enter the vessel and conduct such cleaning or repair work as may be required from time to time.

In order that those skilled in the art may better understand how the present invention can be carried into effect, the following examples are given by way of illustration and not by way of limitation.

*Example 1*

In the continuous solution polymerization of isoprene a solution of 15.0% by weight of isoprene in pentane is pumped continuously into a reactor such as is illustrated in FIGURE 1. In the course of the reaction the viscosity increases to a high value, in the present case as high as 60,000 centipoises, and all of the contents of the reactor are at this high viscosity.

The reactor has a useful capacity of 36.7 gallons or 4.91 cubic feet as measured by water displacement and a heat transfer area of 16.7 square feet. The feed stream is pumped into the reactor at a rate of about 0.4 cubic feet per hour or 16 pounds per hour. This gives a nominal residence time (volume divided by volumetric flow rate) of about 12 hours. The feed stream is preheated to the reaction temperature of about 100° F. and has suitable catalysts and antioxidants dissovled in it as is well known to those skilled in the art. The viscosity of the material in, and leaving, the reactor is about 60,000 centipoises.

The heat released during the reaction is about 450 B.t.u.'s per pound of isoprene polymerized, or about 7200 B.t.u.'s per hour for this test. The cooling water enters the coolant side of the apparatus at 85° F. and leaves at 90° F. From these data it can be easily calculated that the overall heat-transfer coefficient is about 33 B.t.u.'s/(hr.)(sq. ft.)(° F.). This is an unexpectedly and unobviously high value for such a viscous mass and indicates that the apparatus is well suited for removing heat from a viscous reaction mass. The reaction proceeds smoothly and easily with good control to yield polymerized isoprene having substantially uniform physical characteristics.

*Example II*

Pure monomeric styrene is pumped continuously into a reactor such as is illustrated in FIGURE 1 at a rate of about 55.0 pounds per hour at a temperature of 140° C. (284° F.). The effluent from the reactor is about 70% polymerized and is quite viscous. The coolant is a heavy, non-volatile oil with an inlet temperature of 265° F. and an outlet temperature of 270° F. The polymerization of styrene gives up about 256 B.t.u.'s per pound of polymerized material, so that the cooling load on the reactor is about 9650 B.t.u.'s per hour. Under these conditions the reactor heat-transfer coefficient is about 35 B.t.u.'s/(hr.)(sq. ft.)(° F.). The reaction proceeds easily and smoothly under good control.

From the foregoing description and the accompanying drawing it is believed to be clear that the material-treatment apparatus (reactors) of the present invention are particularly effective in mixing chemically reactive, highly viscous fluids while maintaining temperature and concentration gradients within the fluid at a minimum. Although the reaction mass is a fluid, specifically a liquid, mass it is not necessary that the reactive component of the said mass be initially in a liquid state. For example, the apparatus may be employed in mixing a chemical reactant(s) in a liquid phase while incorporating therein, from an upper gaseous phase, a chemically reactive gas or gases or an admixture thereof with a non-reactive gas or gases. Or, if desired or advantageous, a non-reactive gas may be introduced into the reaction mass from an upper gaseous phase.

In all cases, however, the apparatus of this invention makes it possible to carry out a liquid-phase and usually catalyzed chemical reaction, specifically a polymerization reaction, at effective reaction temperatures (e.g., at —40° F. to +700° F. or higher) under such conditions that the deposition of gummy or solid product, specifically polymer, within the apparatus is obviated or minimized. For further details on uses to which the reactors of this invention are especially adapted and reaction conditions commonly employed in such uses see, for instance, U.S. Patents 2,727,884 and 2,875,027.

Having described my invention, what I claim as new and desire to secure by Letters Patent is:

1. Material treatment apparatus comprising in combination
    (a) an outer cylindrical shell,
        (1) means for introducing and removing materials to and from the inside of said shell,
    (b) a heat exchange jacket around said shell,
        (1) inlet and outlet means for conducting heat exchange fluid into and out of said jacket,
    (c) a cylindrical double-walled heat exchange tube inside of and spaced from said shell,
        (1) said cylindrical tube being coaxial therewith,
        (2) inlet and outlet means for circulating heat exchange fluid between the walls of said tube,
    (d) a helical impeller inside said heat exchange tube for moving materials therethrough,
        (1) a first longitudinal scraper having a blade pivotally attached adjacent the outer periphery of said helical impeller for scraping contact with the inside surface of said heat exchange tube as said impeller rotates therein,
    (e) a second longitudinal scraper positioned between said cylindrical shell and the outer surface of said heat exchange tube,
        (1) said second scraper having blades pivotally attached thereto for scraping contact with the outer surface of said heat exchange tube and the inner surface of said shell, and
    (f) a drive shaft connected to said impeller and said second scraper.

2. Material treatment apparatus as defined in claim 1 wherein said blades for said first and second longitudinal scrapers are angled forwardly in the direction of rotation when in scraping contact with their adjacent heat exchange surfaces and said second scraper is provided with blade pivot limiting means confining the angular movement of said blades.

3. Material treatment apparatus, comprising in combination,
    (a) an outer cylindrical shell,
        (1) closure members over each end of said shell,
    (b) a heat exchange jacket around said shell,
    (c) a cylindrical double-walled heat exchange tube inside of and spaced from said shell,
        (1) said cylindrical tube being coaxial therewith,
    (d) a material inlet and outlet for said shell,
    (e) a heat exchange fluid inlet and outlet communicating with the interiors of said jacket and said heat exchange tube,
    (f) a helical impeller inside said heat exchange tube for moving materials therethrough,
        (1) a first longitudinal scraper having a blade attached to the outer periphery of said helical impeller for scraping contact with the inside surface of said heat exchange tube,
    (g) rotary drive means for driving said helical impeller, and
    (h) a second longitudinal scraper having blades pivotally attached to said rotary drive means,
        (1) said second scraper blades being positioned between said heat exchange tube and said shell for scraping contact with the outer surface of said heat exchange tube and the inner surface of said cylindrical shell
whereby materials are scraped from the heat exchange surfaces in the apparatus and are mixed by eddy motion produced by said helical impeller and said scrapers.

4. In material treatment apparatus having heat exchange surfaces, an inlet and an outlet for material to be treated, an inlet and outlet for heat exchange fluids, and means for conducting heat exchange fluid from said inlet past said heat exchange surfaces to said outlet, the combination of
    (a) a plurality of concentric cylindrical heat exchange surfaces,
        (1) the innermost of said heat exchange surfaces forming a tube,
    (b) a helical impeller positioned within said tube for moving materials therethrough,
    (c) pivotally and rotatably mounted scraping means in scraping engagement with each of said plurality of concentric heat exchange surfaces, and
    (d) drive means for rotating said impeller and said scraping means relative to said surfaces, whereby materials are scraped from the inner heat exchange surface of said tube and are mixed together by eddy motion as the impeller material stream mixes with the transversely moving fluid stream from said scraper means.

5. Material treatment apparatus, comprising in combination,
 (a) a cylindrical shell having
   (1) means for introducing and removing materials to and from the inside thereof,
 (b) a heat exchange jacket around said shell,
 (c) an open-ended cylindrical draft tube
   (1) inside of and concentric with said shell,
   (2) said tube having spaced double walls closed at each end thereof
 (d) helical impeller means rotatable within said draft tube,
   (1) said impeller means having scraping contact with the inner surface of said draft tube,
 (e) inlet and outlet means for conducting heat exchange fluid to and from said jacket and between the walls of said draft tube,
 (f) a scraper positioned between the outer wall of said draft tube and said shell
   (1) said scraper having pivotally mounted blade means for scraping the outer wall of said draft tube and the inner surface of said shell, and
 (g) drive means for concentrically rotating said helical impeller means within said draft tube and said scraper within said shell.

6. Material treatment apparatus, comprising in combination,
 (a) a cylindrical shell having
   (1) means for introducing and removing materials to and from the inside thereof,
 (b) a heat exchange jacket around said shell,
 (c) an open-ended cylindrical draft tube
   (1) inside of and concentric with said shell,
   (2) said tube having spaced double walls closed at each end thereof
 (d) helical impeller means rotatable within said draft tube,
   (1) said impeller means having scraping contact with the inner surface of said draft tube,
 (e) means for supplying heat exchange fluid to said jacket and between the walls of said draft tube,
 (f) a second open-ended cylindrical tube
   (1) concentric with said draft tube and said shell,
   (2) said second tube having double walls closed at each end to provide inner and outer heat exchange surfaces thereon,
 (g) inlet and outlet means for conducting heat exchange fluid to and from the space between the walls of said second tube,
 (h) scrapers positioned to rotate about both sides of said second tube,
   (1) said scrapers having blade means to scrape the outer cylindrical surface of said draft tube, both cylindrical surfaces of said second tube and the inner cylindrical surface of said shell, and
 (i) drive means for concentrically rotating said helical impeller and said scrapers.

7. In material treatment apparatus having a plurality of cylindrical, substantially concentric heat exchange surfaces wherein the innermost heat exchange surface is inside a double-walled, open-ended draft tube freely communicating with the other heat exchange surfaces, and having means for heating or cooling said heat exchange surfaces, the combination of
 (a) a helical impeller rotatably mounted for rotation within said draft tube and having peripheral means in scraping contact with the internal surface of the draft tube,
   (1) having an axis of rotation concentric with said heat exchange surfaces
 (b) pivoting scraping means mounted for concentric rotation with said impeller axis,
   (1) said scraping means being rotatable around the outside of said draft tube and
   (2) contacting substantially all heat exchange surfaces other than said innermost heat exchange surface, and
 (c) drive means for rotating said helical impeller and said scraping means about said axis of said helical impeller.

8. The combination defined in claim 7 wherein said helical impeller is provided with peripheral pivoting scraper blades protruding diagonally outward and forward to be held by the impelled material in the draft tube in scraping contact with said draft tube as said helical impeller rotates therein.

References Cited by the Examiner
UNITED STATES PATENTS

| | | | |
|---|---|---|---|
| 2,054,841 | 9/36 | Taylor | 62—354 |
| 2,199,670 | 5/40 | Lowry | 210—179 |
| 2,367,149 | 1/45 | Smith | 165—168 X |
| 2,577,856 | 12/51 | Nelson | 23—288.3 X |
| 2,761,657 | 9/56 | Rietz | 165—87 |
| 3,004,018 | 10/61 | Naylor | 260—94.3 |
| 3,074,924 | 1/63 | Kizer et al. | 260—95 |

MORRIS O. WOLK, *Primary Examiner.*